US010307974B2

(12) United States Patent
Kline et al.

(10) Patent No.: US 10,307,974 B2
(45) Date of Patent: Jun. 4, 2019

(54) METHOD AND APPARATUS FOR REDUCING PLY WRINKLING OF COMPOSITE LAMINATES DURING FORMING

(71) Applicant: The Boeing Company, Chicago, IL (US)

(72) Inventors: William Thomas Kline, Burien, WA (US); Christopher Gary Harris, Auburn, WA (US)

(73) Assignee: The Boeing Company, Chicago, IL (US)

( * ) Notice: Subject to any disclaimer, the term of this patent is extended or adjusted under 35 U.S.C. 154(b) by 30 days.

(21) Appl. No.: 15/373,347

(22) Filed: Dec. 8, 2016

(65) Prior Publication Data

US 2017/0087782 A1    Mar. 30, 2017

Related U.S. Application Data

(62) Division of application No. 13/847,046, filed on Mar. 19, 2013, now Pat. No. 9,573,301.

(51) Int. Cl.
B29C 70/56      (2006.01)
B29C 43/32      (2006.01)
B29C 70/34      (2006.01)
B29C 70/54      (2006.01)
B29K 307/04     (2006.01)
B29K 309/08     (2006.01)
B29L 9/00       (2006.01)

(52) U.S. Cl.
CPC .............. B29C 70/56 (2013.01); B29C 43/32 (2013.01); B29C 70/342 (2013.01); B29C 70/541 (2013.01); B29K 2307/04 (2013.01); B29K 2309/08 (2013.01); B29L 2009/00 (2013.01)

(58) Field of Classification Search
CPC ........ B29C 70/56; B29C 70/541; B29C 70/54
USPC ......................................................... 425/383
See application file for complete search history.

(56) References Cited

U.S. PATENT DOCUMENTS 5,348,602 A    9/1994  Makarenko et al.
5,464,337 A   11/1995  Bernardon et al.
5,578,158 A *  11/1996  Gutowski ............... B29C 70/44
                                                       156/222
5,648,109 A *  7/1997   Gutowski ............. B29C 51/085
                                                       156/212
(Continued)

FOREIGN PATENT DOCUMENTS

DE    102010043665    5/2012
EP       1393875       3/2004
(Continued)

OTHER PUBLICATIONS

Office Action and translation for Chinese Patent Application No. 201480009846.X dated Jan. 15, 2017.
(Continued)

Primary Examiner — Christina A Johnson
Assistant Examiner — Xue Liu
(74) Attorney, Agent, or Firm — Kunzler Bean & Adamson

(57) ABSTRACT

Ply wrinkling during hot drape forming of a composite laminate is reduced at corner radii. A tensioning material placed over an uncured composite laminate charge maintains a compressive force on the laminate charge as the charge is formed over a tool.

19 Claims, 11 Drawing Sheets

(56) References Cited

U.S. PATENT DOCUMENTS

| | | |
|---|---|---|
| 5,772,950 A | 6/1998 | Brustad et al. |
| 6,814,916 B2 | 11/2004 | Wilden et al. |
| 7,118,370 B2 | 10/2006 | Wilden et al. |
| 8,236,222 B2 | 8/2012 | Henderson et al. |
| 2002/0012591 A1 | 1/2002 | Montague et al. |
| 2003/0146543 A1 | 8/2003 | Lebrun et al. |
| 2015/0183171 A1 | 7/2015 | Kline et al. |

FOREIGN PATENT DOCUMENTS

| | | |
|---|---|---|
| JP | 10507697 | 7/1998 |
| JP | 2010540294 | 12/2010 |
| WO | 2009044194 | 4/2009 |
| WO | 2012099512 | 7/2012 |

OTHER PUBLICATIONS

Mallon et al., "Polymeric diaphragm forming of complex-curvature thermoplastic composite parts," Composites, Jan. 1989, pp. 48-56, vol. 20—No. 1, Butterworth & Co, LTD.

Office Action for Chinese Application 201480009846.X dated Sep. 1, 2016.

International Search Report and Written Opinion for PCT Application No. PCT/US2014/018346 dated Dec. 5, 2014.

Notice of Allowance for U.S. Appl. No. 13/847,046 dated Sep. 8, 2016.

Canadian Office Action for Canadian Patent Application No. 2,899,074 dated Sep. 26, 2016.

International Preliminary Report of Patentability for PCT Application No. PCT/US2014/018346 dated Mar. 19, 2013.

Ott, Thomas, "Composite Hot Drape Forming," Boeing Defense & Space Group Operations Technology, Helicopters Division, pp. 74-80.

Communication from the International Searching Authority for PCT Patent Application No. PCT/US2014/018346 dated Sep. 2, 2014.

Office Action and English translation for Chinese Patent Application No. 201480009846.X dated May 12, 2017.

Office Action and English translation for Japanese Patent Application No. 2016-504294 dated Aug. 22, 2017.

* cited by examiner

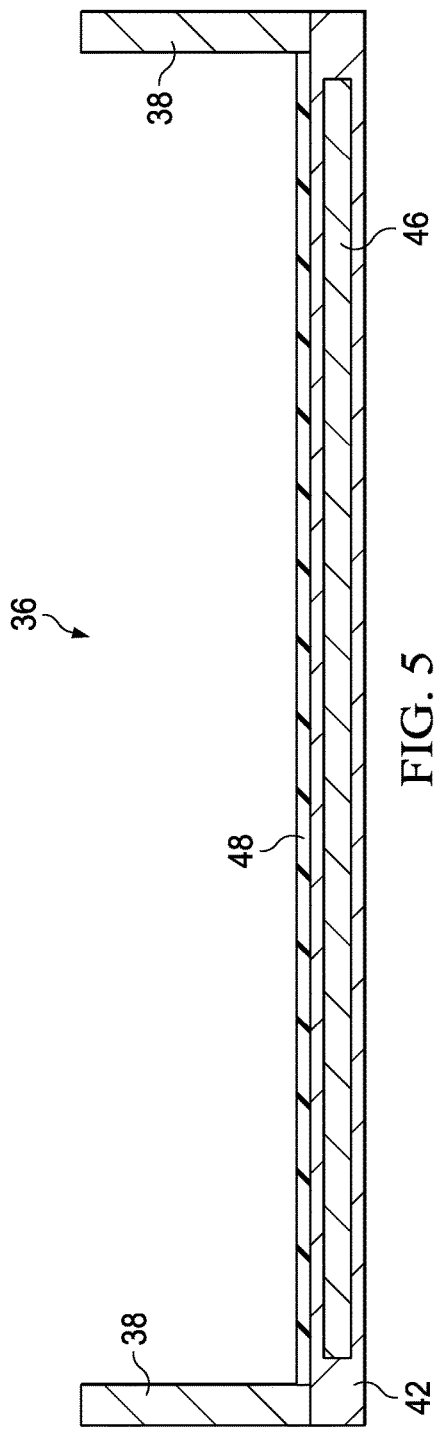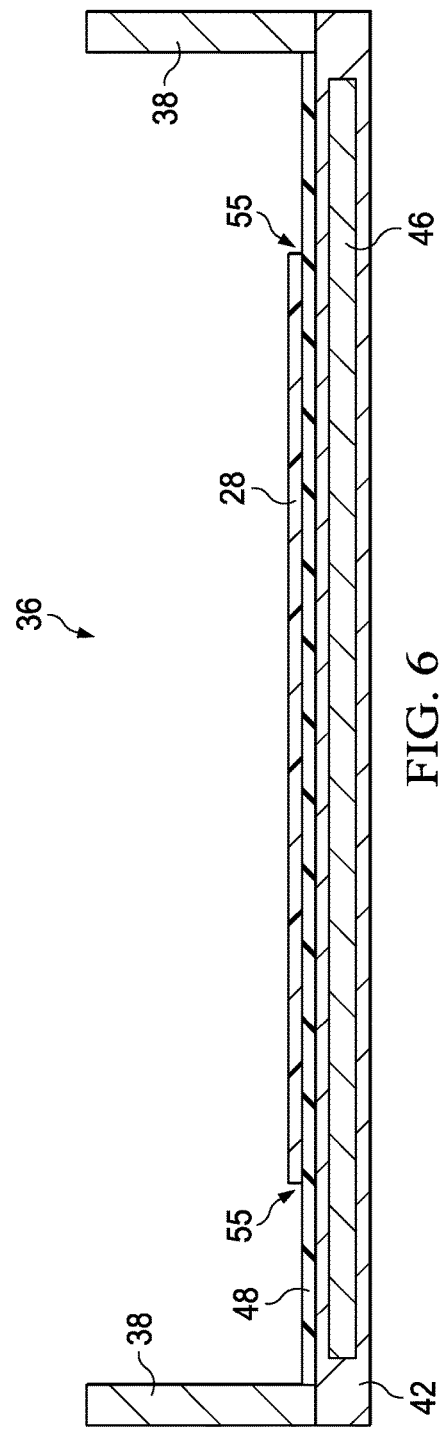

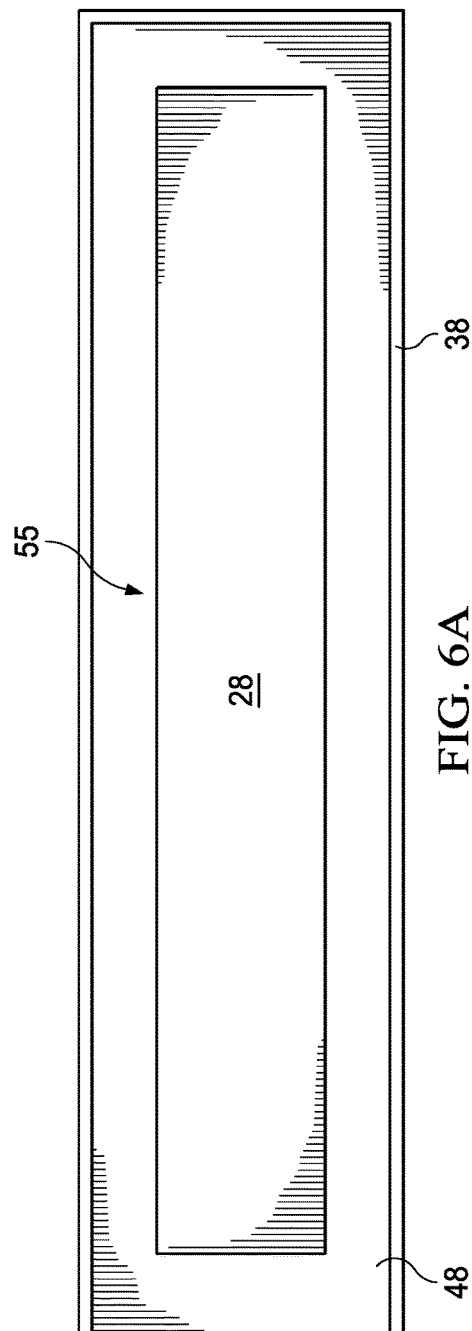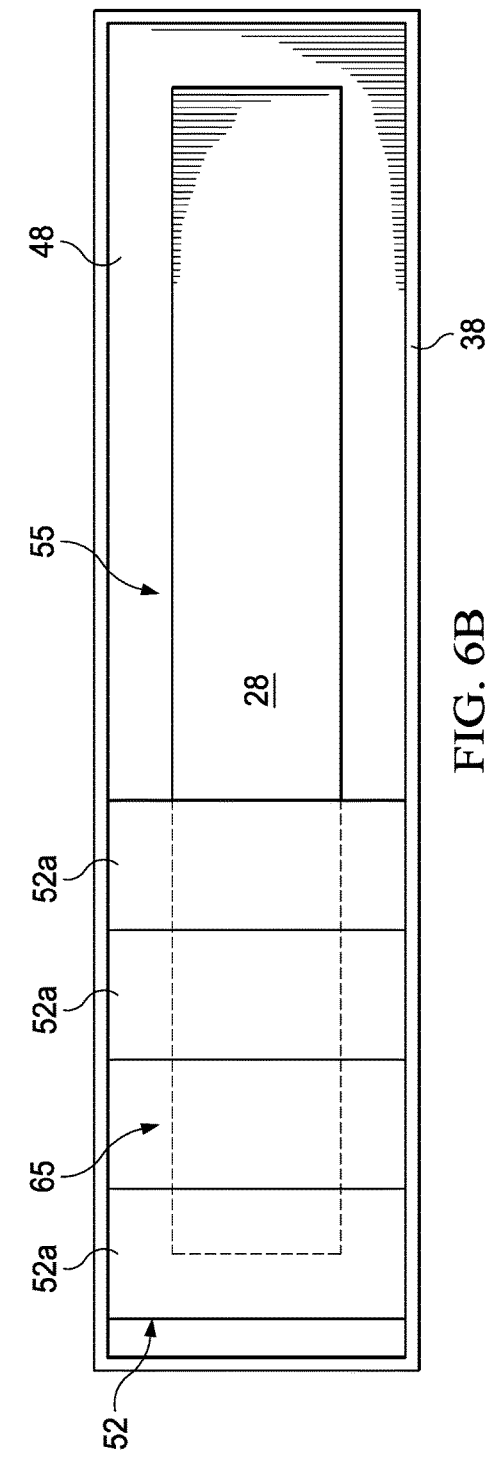

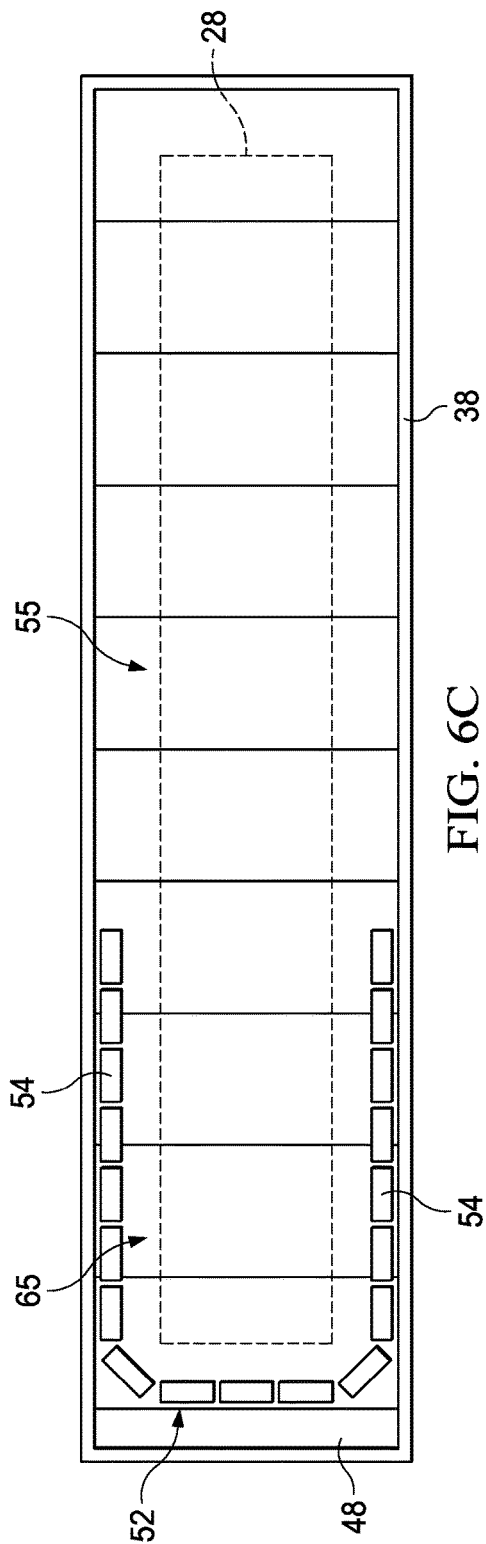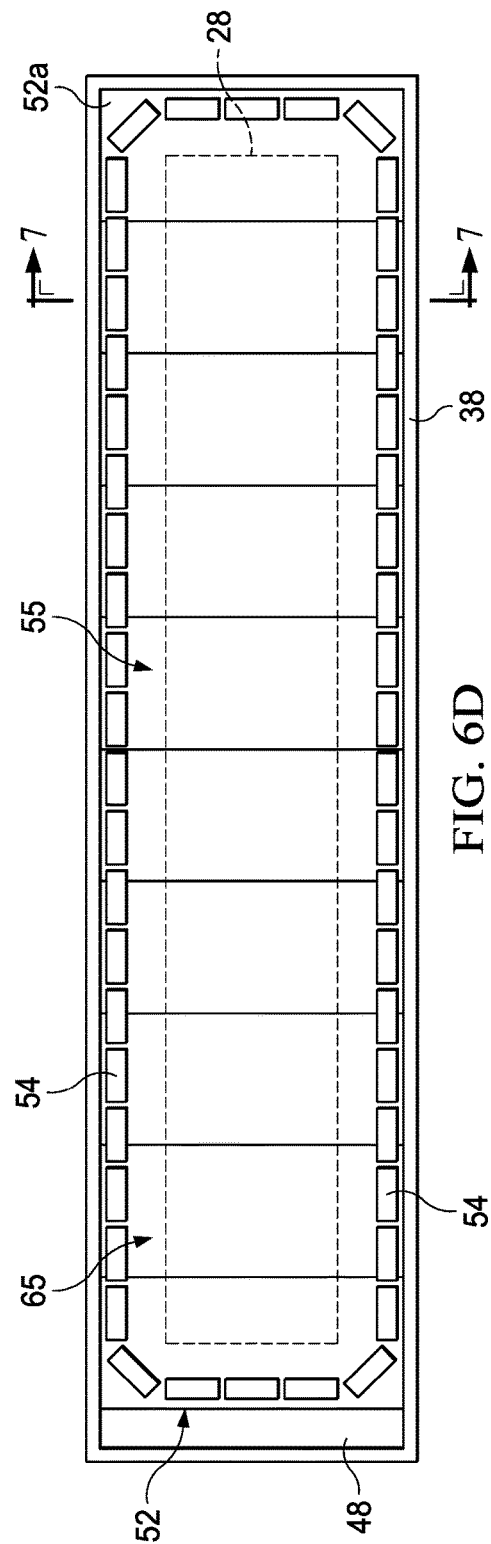

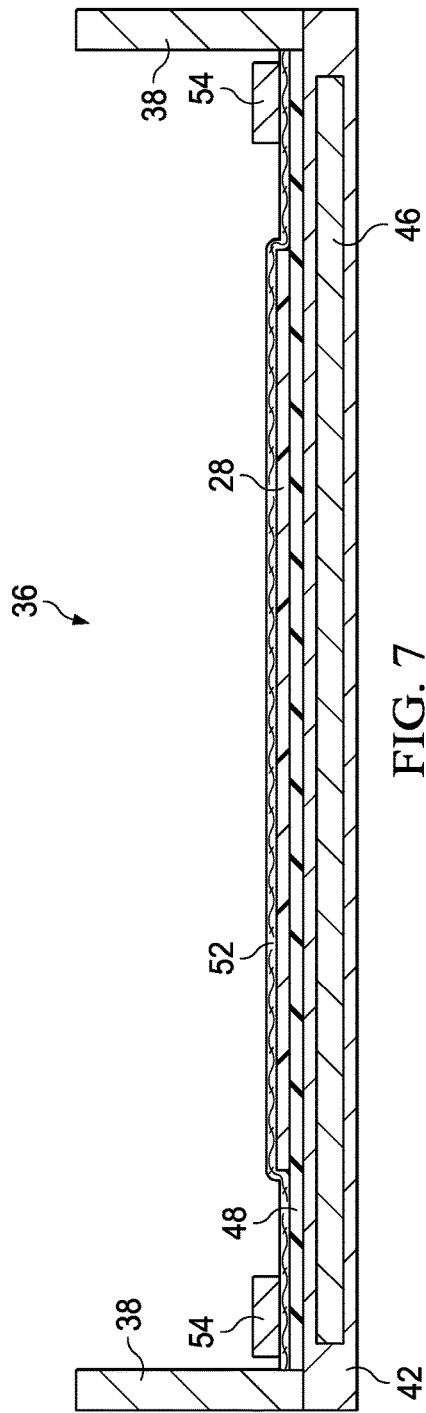
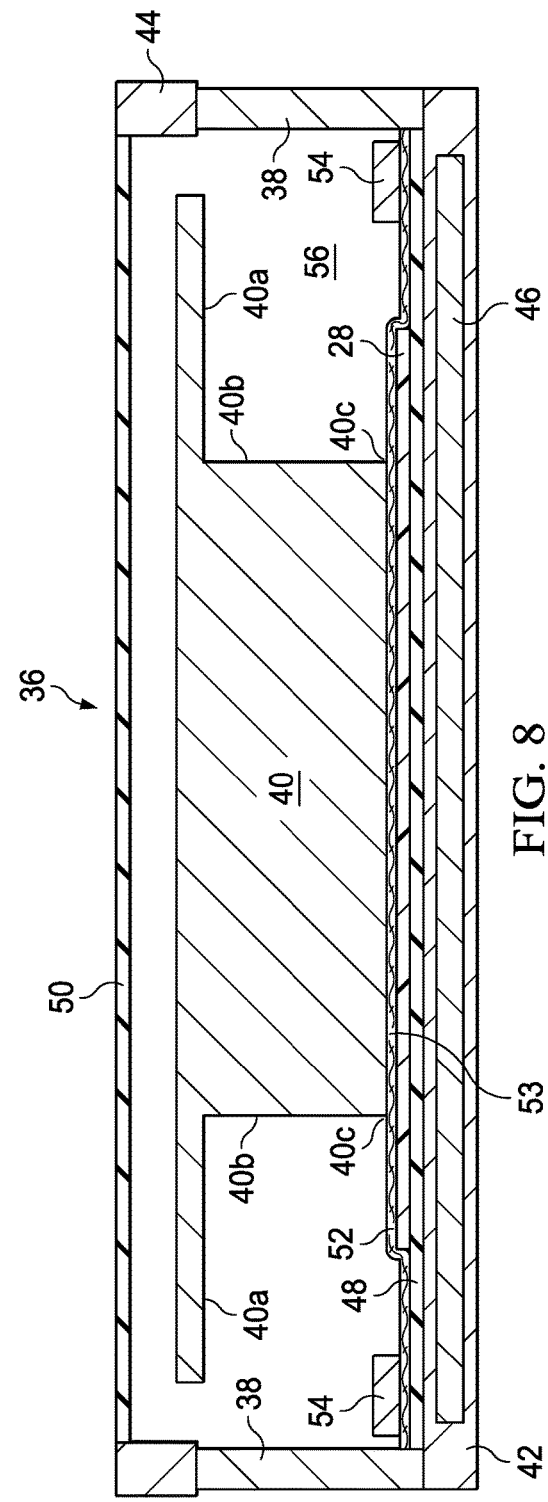

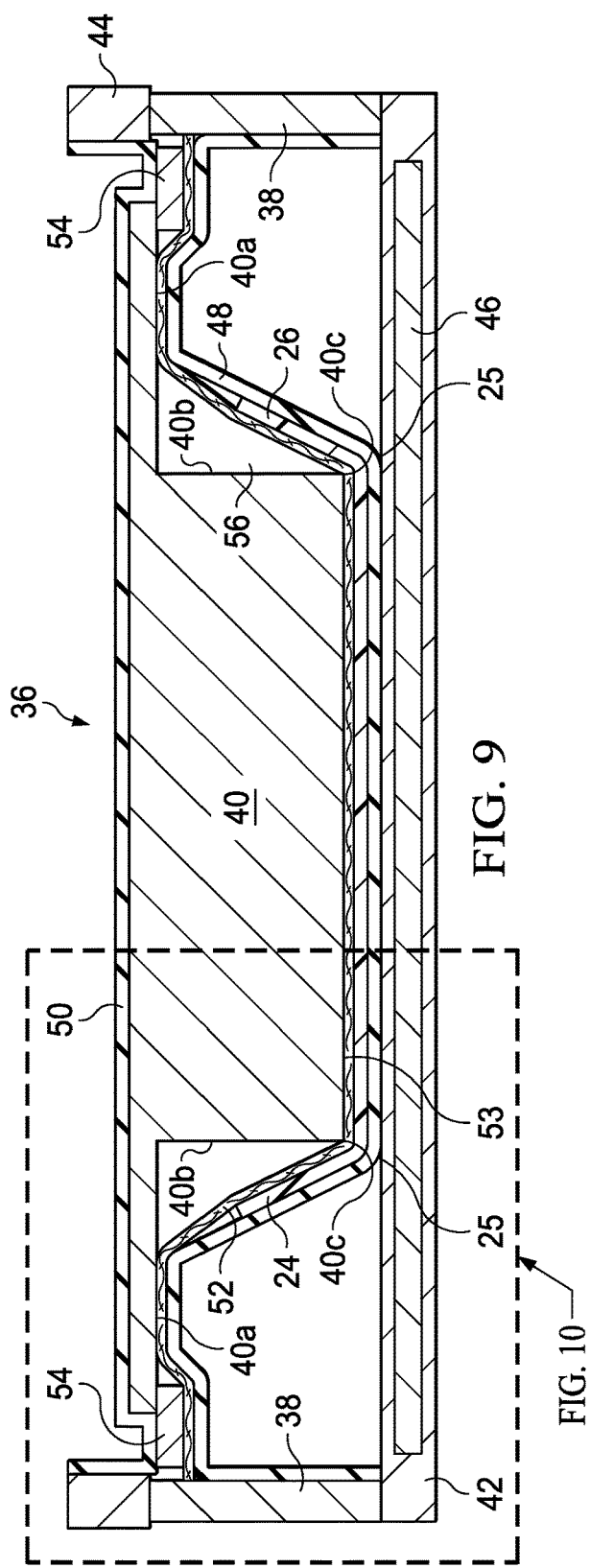

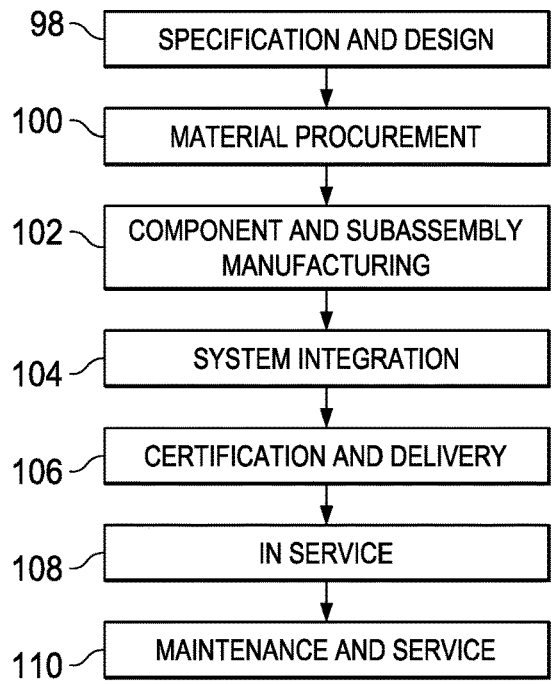
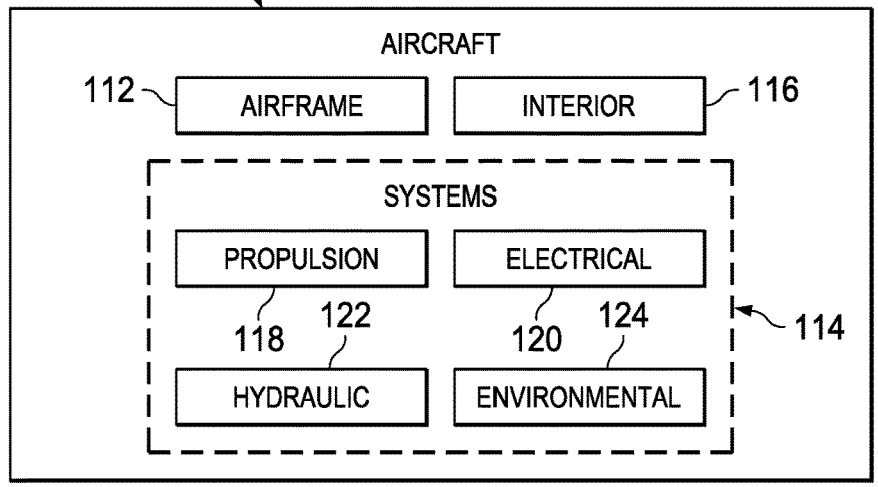

METHOD AND APPARATUS FOR REDUCING PLY WRINKLING OF COMPOSITE LAMINATES DURING FORMING

BACKGROUND INFORMATION

1. Field

The present disclosure generally relates to processes for forming composite laminates, and deals more particularly with a method and apparatus for reducing ply wrinkling during hot drape forming of radius features.

2. Background

Hot drape forming may be used to form features such as flanges of a composite laminate part such as a stiffener. Hot drape forming is carried out by clamping and stretching a laminate charge in a frame, and heating it until soft enough to form. A pressure differential is then applied to the charge to form it over a shaped male tool. In one version of the process, known as top down forming, a compacted laminate charge is heated and formed down over a mandrel-like male tool. In another version of the process, referred to as inverted forming, the laminate charge is placed on a forming table, and a male tool is inverted and placed on top of the laminate charge. After the laminate charge is heated to forming temperature, a vacuum bladder beneath the laminate charge forms the charge upwardly onto and over the male tool.

Using either version of hot drape forming process described above, problems may be encountered when forming part features having relatively sharp radius corners. For example, when forming a composite angle stiffener having an inside radius corner between a flange and a web, the ply material closest to the male tool has a tendency to bunch, gather and form creases or wrinkles that may affect the mechanical performance of the stiffener. In some cases, the completed stiffener may be reworked to reduce creasing/wrinkling, while in other cases the stiffener must be scrapped. In either case, the problem of ply material creasing/wrinkling increases labor and/or material costs.

Accordingly, there is a need for a method and apparatus which substantially reduces or eliminates ply material creasing/wrinkling during hot drape forming of composite laminate parts having radius features. There is also a need for a method and apparatus of the type mentioned above which is cost-effective, easily implemented and which may reduce material and/or labor costs.

SUMMARY

The disclosed embodiments provide a method and apparatus for hot drape forming composite laminates which may reduce or eliminate ply wrinkling along radius features, such as inside corners. Ply wrinkling is reduced by maintaining plies in compression that are closest to a forming tool over which a composite laminate charge is formed. A compressive force is maintained on the plies by placing a tensioning material over the charge and maintaining tension on the tensioning material as the radius features being formed. The tensioning material applies a compressive force to the plies in the area of the radius features which prevents these plies from bunching or gathering. The reduction or elimination of ply wrinkling may reduce the need for reworking composite laminate parts, thereby reducing labor costs. Part scrap may also be reduced, thereby reducing material costs. The method and apparatus may be easily implemented without additional tooling, using simple, low-cost materials.

According to one disclosed embodiment, a method is provided of reducing ply wrinkling during hot drape forming of a composite laminate. The method comprises placing a tensioning material over an uncured composite laminate charge, hot drape forming the laminate charge over a forming tool, and using the tensioning material to compress the laminate charge as the laminate charge is being formed over the forming tool. The method may further comprise indexing the laminate charge on a table, and placing the tensioning material over the laminate charge may include overlapping peripheral edges of the tensioning material onto the table and loading the peripheral edges of the tensioning material against the table. Loading the peripheral edges of the tensioning material is performed by placing weights on the peripheral edges of the tensioning material. Hot drape forming may include sealing a flexible forming membrane over the laminate charge, drawing a vacuum between the forming membrane and the tool, and using the forming membrane to form the laminate charge over surfaces of the tool. Using the tensioning material to compress the laminate charge may include compressing the charge against the forming membrane as the forming membrane forms the charge over surfaces of the tool. Placing the tensioning material over the laminate charge may include placing a plurality of sheets of fiberglass on the laminate charge which collectively cover substantially the entire area of the laminate charge, wherein each of the sheets extends beyond peripheral edges of the laminate charge. The method may also comprise retaining the peripheral edges of each of the sheets as the laminate charge is being hot drape formed over the tool.

According to another embodiment, a method is provided of hot drape forming a composite laminate part that reduces ply wrinkling along an inside corner of the composite laminate part, comprising placing at least one sheet of tensioning material over an uncured composite laminate charge, and retaining edges of the tensioning material, The method also includes hot drape forming the combination of the laminate charge and the tensioning material over an outside corner of a forming tool, and using the tensioning material to maintain a compressive force on the laminate charge at the inside corner of the laminate charge as the laminate charge is being hot drape formed over the outside corner of the forming tool. Placing the at least one sheet of tensioning material over the laminate charge includes placing the sheet of tensioning material in face-to-face, overlying contact with the laminate charge. The hot drape forming is performed using a flexible membrane to force the laminate charge around the outside corner of the forming tool as a compressive force on the laminate charge is being maintained by the tensioning material. Retaining the edges of the tensioning material against movement is performed by placing weights on the edges of the tensioning material. The method may further comprise placing and indexing the laminate charge on a table, and placing the sheet of tensioning material over the laminate charge may include placing the at least one sheet of tensioning material on the table, overlying the laminate charge and in face-to-face contact therewith.

According to still another embodiment, a method is provided of preventing ply wrinkling during hot drape forming of a composite laminate part having at least one flange, comprising placing an uncured composite laminate charge on a supporting surface, and covering the laminate charge with a layer of tensioning material, including extending peripheral edges of the tensioning material outwardly beyond the laminate charge. The method also includes weighting the peripheral edges of the tensioning material against the supporting surface, forming the laminate charge over a tool, including forming the at least one flange by forming a portion of the laminate charge over a radiused tool corner, and using the layer of tensioning material to apply a compression force to the laminate charge along the radiused tool corner. The method also comprises unweighting the peripheral edges of the tensioning material, and removing the layer of tensioning material after the laminate charge has been formed. The method may also include removing the compressive force on the laminate charge during forming of the laminate charge over the tool after the portion of a laminate charge is formed over the radiused tool corner. Weighting of the peripheral edge may be performed by placing weights on the peripheral edge at substantially uniformly distributed locations around the peripheral edge. The method may further comprise allowing the tensioning material to tear as the portion of the laminate charge is being formed over the tool.

According to still another embodiment, apparatus is provided for hot drape forming a composite laminate part, comprising a tool over which a composite laminate charge may be formed, the tool including at least one corner feature for forming a radius on the part, a forming membrane adapted to form the laminate charge over the tool, and tensioning material between the forming membrane and the laminate charge for applying a compression force on the laminate charge at the corner to reduce wrinkling of the laminate charge at the radius during the forming. The tensioning material may include at least one sheet disposed in face-to-face contact with the laminate charge and having an outer periphery extending beyond outer edges of the laminate charge. The tensioning material has a tensile strength allowing the tensioning material to tear as the laminate charge is being formed over the tool. The apparatus may further include weights distributed around and loaded onto the outer periphery of the sheet for retaining the sheet around the outer periphery thereof. The tensioning material may include a sheet having surface tack adherence to the laminate charge.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 5 is an illustration of a cross-sectional view of the forming table forming part of the machine shown in FIG. 4.

FIG. 6 is an illustration similar to FIG. 5 but showing a composite laminate charge having been placed on the forming table, overlying a lower forming membrane.

FIG. 6A is an illustration of a plan view of the forming table with a composite laminate charge having been placed thereon.

FIG. 6B is an illustration of a plan view similar to FIG. 6A, but showing several sheets of the tensioning material having been placed on the forming table, overlying the laminate charge.

FIG. 6C is an illustration of a plan view similar to FIG. 6B, but showing the remainder of the tensioning material sheets having been placed on the forming table, with tensioning weights having been placed partially around the perimeter of the tensioning material.

FIG. 6D is an illustration of a plan view similar to FIG. 6C, but showing the remainder of the tensioning weights placed around the perimeter of the tensioning material.

FIG. 7 is an illustration of a cross-sectional view taken along the line 7-7 in FIG. 6D.

FIG. 8 is an illustration of a cross-sectional view of the forming table, a male forming tool and an upper membrane having been installed.

FIG. 9 is an illustration similar to FIG. 8 but showing flanges of the channel stiffener partially formed.

FIG. 13 is an illustration of a flow diagram of aircraft production and service methodology.

FIG. 14 is illustration of a block diagram of an aircraft.

DETAILED DESCRIPTION

Figure 1:
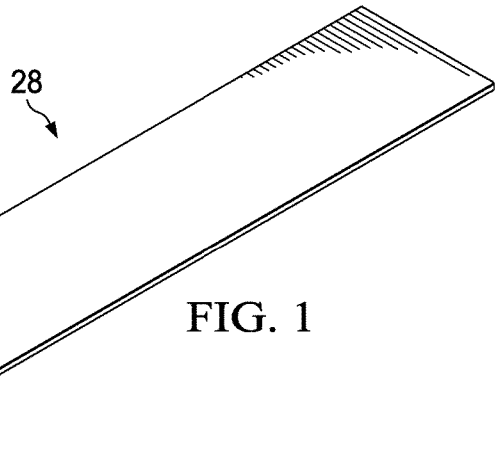
FIG. 1 is illustration of a perspective view of a composite laminate charge.
Figure 2:
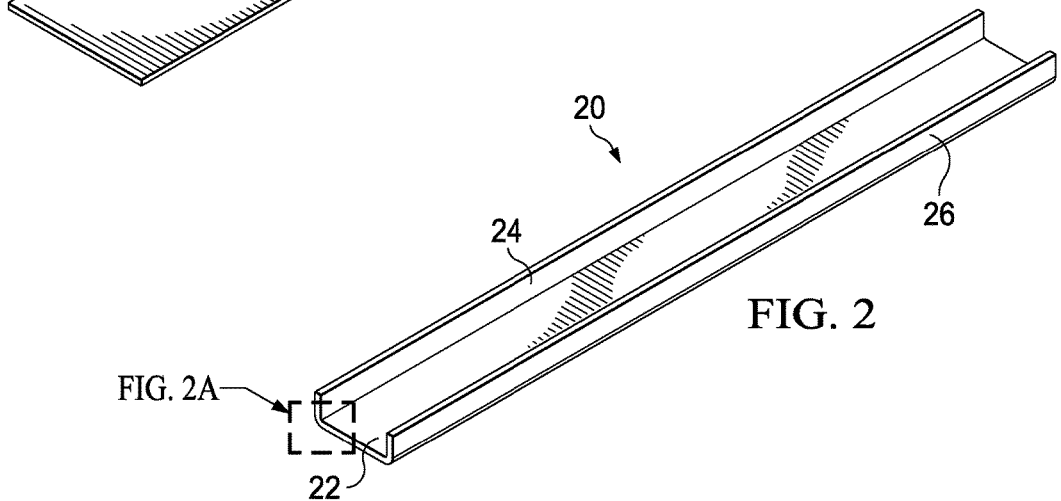
FIG. 2 is an illustration of a perspective view of a U-shaped channel stiffener produced by hot drape forming of the laminate charge shown in FIG. 1.
Figure 2A:
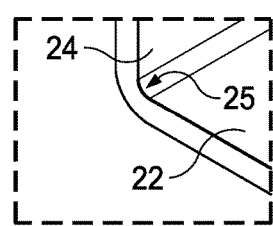
FIG. 2A is an illustration of the area designated as FIG. 2A in FIG. 2.
Figure 3:
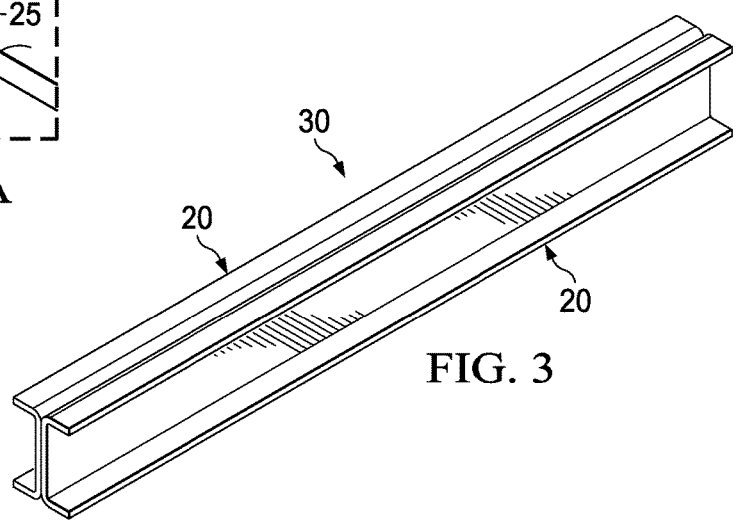
FIG. 3 is an illustration of a perspective view of an I-beam produced by assembling two of the U-shaped channel stiffeners shown in FIG. 2.

Referring first to FIGS. 1 and 2, a multiply, composite laminate charge 28 may be formed into a laminate part such as a U-shaped channel stiffener 20 using a hot drape forming (HDF) process. The laminate charge 28 may comprise, without limitation, a carbon fiber reinforced plastic (CFRP). The composite laminate stiffener 20 may have a wide variety of applications. For example, two of the stiffeners 20 may be joined together back-to-back as shown in FIG. 3 to form an I-beam that may be used for example and without limitation, in the aircraft industry as a wing spar 30. The stiffener 20 comprises a web 22 and a pair of flanges 24, 26 that transition outwardly from the web 22 along an inside corner radius 25. The U-shaped channel stiffener 20 described above is merely exemplary of a wide variety of composite laminate structures having features such as the inside corner radius 25 that may result in gathering or bunching of the plies during the HDF process.

Figure 4:
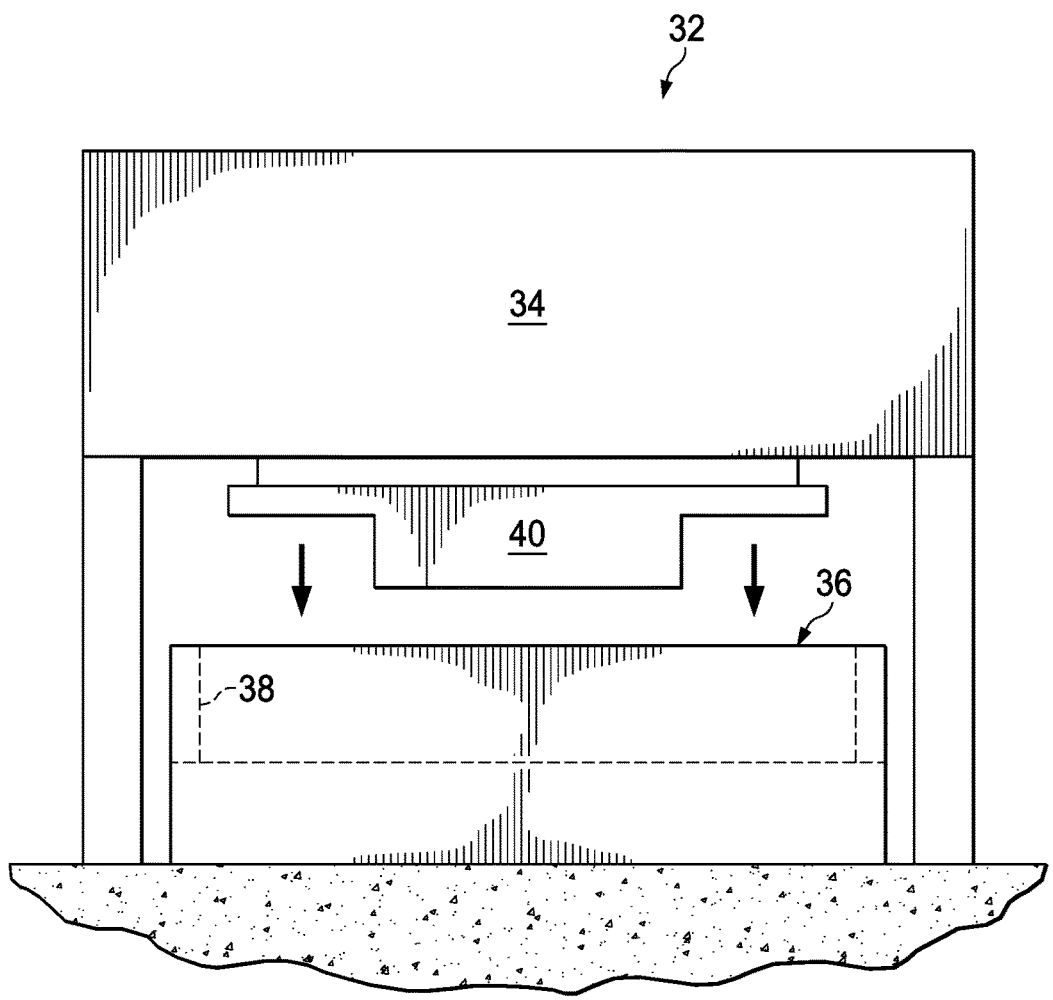
FIG. 4 is an illustration of a front view of a hot drape forming machine.

Referring now to FIG. 4, the stiffener 20 shown in FIGS. 2-3 may be formed in an HDF machine 32. The HDF machine 32 broadly comprises a former 34, a forming table 36 having a peripheral lower frame 38, and a mandrel-like, male forming tool 40 over which a composite laminate charge 28 (FIG. 1) is formed after being heated to forming temperature. As shown in FIG. 5, the forming table 36 includes a support base 42 having an integrated heating element 46 for heating the laminate charge 28 to forming temperature. Although not shown in the Figures, indexing devices may be provided for indexing the location of a laminate charge 28 placed on the support base 42.

Referring to FIGS. 5, 6 and 6A, a forming membrane 48 comprising a flexible, stretchable material such as, without limitation, a silicone, is stretched over the support base 42 within the lower frame 38. In preparation for carrying out an HDF operation, a substantially flat composite laminate charge 28 is placed on the forming table 36, in face-to-face, overlying contact with the forming membrane 48. The support base 42 provides a surface for supporting the laminate charge 28 thereon. As previously mentioned, indexing devices may be used to locate the laminate charge 28 in a desired position of the support base 42. Next, as shown in FIG. 6B, tensioning material 52 is placed over the laminate charge 28. The tensioning material 52 extends outwardly beyond the outer periphery 55 of the laminate charge 28 to the lower frame 38, and overlaps forming membrane 48.

Depending upon the application as well as the size/geometry of the laminate charge 28, the tensioning material 52 may comprise a plurality of individual tensioning sheets 52a which, in the illustrated example, are generally rectangular in shape and extend transversely across the width of the laminate charge 28. The adjacent edges of the sheets 52a may abut or overlap each other. The tensioning material 52 comprises a stretchable material having a preselected tensile strength which, when exceeded may result in the tensioning material 52 tearing or separating. The tensioning material 52 also possesses tack which allows it to adhere to the underlying the forming membrane 48. In one embodiment, the tensioning material 52 may comprise a resin impregnated cloth such as, without limitation, an epoxy impregnated fiberglass woven cloth.

Referring now to FIG. 6C, with the tensioning material 52 installed over the laminate charge 28, the outer perimeter 65 of the tensioning material 52 is retained during the forming process. In one embodiment, the tensioning material 52 is retained by placing a plurality of individual weights 54 on the tensioning material 52, which load the perimeter 65 of the tensioning material 52 against the forming membrane 48 and support base 42. The weights 54 may comprise, for example and without limitation, bags filled with a relatively heavy material such as lead shot. Other techniques for retaining the outer perimeter 65 of the tensioning material 52 are possible. Depending upon the application, the entire perimeter 65 of the tensioning material 52 is loaded using individual weights 54, as shown in FIG. 6D. As best seen in FIG. 7, the loading provided by the weights 54 places the tensioning material in tension, drawing it down against the laminate charge 28.

Attention is now directed to FIGS. 8-11 which sequentially illustrate a process of hot drape forming the laminate charge 28 into the U-shaped channel stiffener 20 (FIG. 2) using the HDF machine 32 shown in FIG. 4. As illustrated in FIG. 8, a forming tool 40 is moved onto the forming table 36 and placed on top of the laminate charge 28, thereby sandwiching the tensioning material 52 between the bottom face 53 of the tool 40, and the laminate charge 28. The forming tool 40 also includes oppositely facing sides 40b, and a pair of laterally extending flanges 40a. With the forming tool 40 on top of the laminate charge 28, an upper frame 44 is then lowered onto and sealed against the lower frame 38. A membrane 50 stretched across and sealed to the upper frame 44, creates, together with the forming membrane 48, a substantially vacuum tight cavity 56. Although not shown in the Figures, the hot drape forming machine 32 (FIG. 4) includes a system for evacuating the cavity 56.

In preparation for an HDF operation, the heating element 46 is activated in order to heat the laminate charge 28 to a desired forming temperature. Next, a vacuum is drawn within cavity 56. Referring particularly to FIG. 9, the vacuum within cavity 56 draws the membrane 50 down against the forming tool 40, while the forming membrane 48 is drawn upwardly against the outer flanges 40a. The forming membrane 48 also begins forming the flanges 24, 26 of the laminate charge 28, rotating them about corners 40c of the tool 40 to form the corner radii 25. The forming membrane 48 stretches and moves upwardly and outwardly, conforming to the lower frame 38, while both the tensioning material 52 and the weights 54 move upwardly. This upward movement of the tensioning material 52 presses the tensioning material 52 against the tool flanges 40a.

Figure 10:
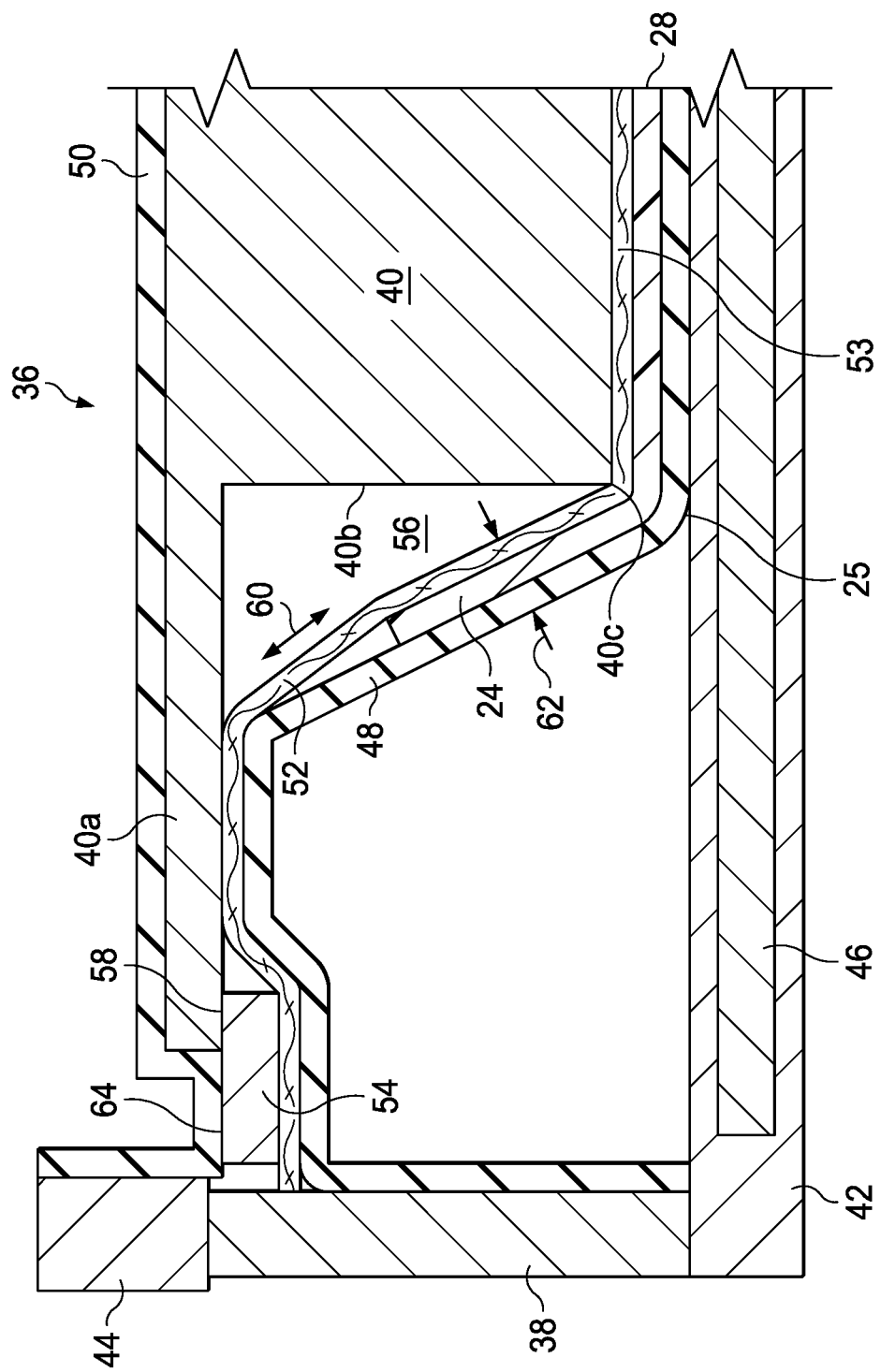
FIG. 10 is an illustration of the area designated as FIG. 10 in FIG. 9.

Referring particularly to FIGS. 9 and 10, as the forming membrane 48 stretches and moves upwardly, folding the flanges 24, 26, it tensions 60 the material 52, and, to some degree, may slightly stretch the material 52. The tension 60 in the tensioning material 52 comprises and loads 62 the flanges 24, 26 against the forming membrane 48. The compression loading 62 of the flanges 24, 26 against the forming membrane 48 maintains the plies of the flanges 24, 26 (particularly those plies closest to the tool 40) substantially flat, thereby reducing or eliminating any tendency of these plies to bunch, gather, collect or otherwise move out of plane as forming of the flanges 24, 26 continues.

Figure 11:
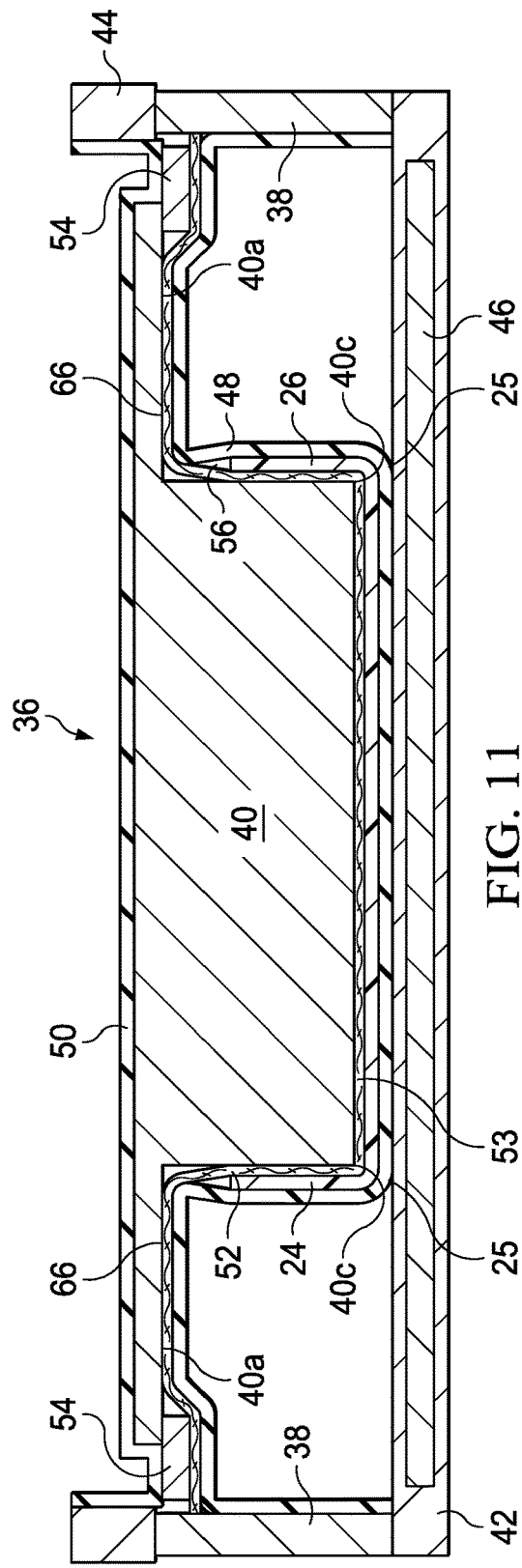
FIG. 11 is an illustration similar to FIG. 9, but showing the flanges having been fully formed and the tensioning material partially torn.

Referring now to FIG. 11, the tensioning material 52 maintains a compression load 62 on the flanges 24, 26 to prevent ply wrinkling until each of the corner radii 25 is substantially fully formed. As the vacuum in the cavity 56 continues to increase and forming membrane 48 continues forming the flanges 24, 26 toward the sides 40b (FIG. 9) of the forming tool 40, the force applied by the forming membrane 48 to the tensioning material 52 increases until the tension 60 exceeds the tensile strength of the tensioning material 52, resulting in the tensioning material 52 tearing or separating 66 in the area of the tool flanges 40a. These tears or separations 66 in the tensioning material 52 release the tension 60 in the tensioning material 52, thereby eliminating resistance to the continued inward forming movement of forming membrane 48 toward the tool 40, allowing continued forming of the flanges 24, 26 toward the sides of 40b of the forming tool 40.

Figure 12:
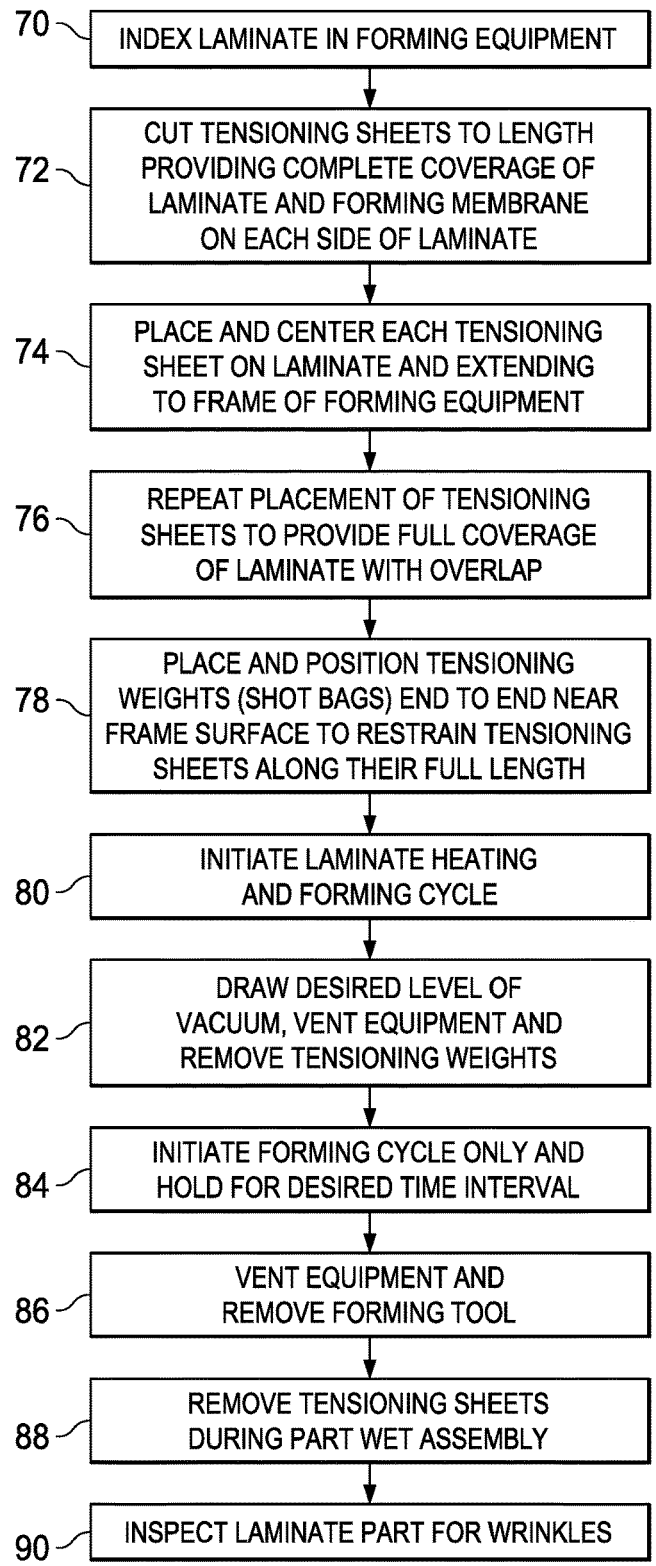
FIG. 12 is an illustration of a flow diagram of a method of hot drape forming a composite laminate charge.

Attention is now directed to FIG. 12 which illustrates additional details of one embodiment of a method of hot drape forming a composite laminate part that reduces or eliminates ply wrinkling in radius areas. Beginning at step 70, a suitable multi-ply composite laminate charge is placed and indexed in suitable forming equipment, such as an HDF machine 32. At 72, tensioning material 52 is cut into individual sheets 52a of a desired length. The number of tensioning sheets 52a that are cut is sufficient to provide complete coverage of the laminate charge 28 and the forming membrane 48 on each side of the charge 28. At step 74, each sheet 52a is placed and centered on the laminate charge 28, extending outwardly beyond the periphery of the charge 28 to the forming frame. At 76, additional sheets 52a of the tensioning material 52 are placed in order to provide full coverage of the laminate charge 28 with a desired overlap of the sheets 52a. At 78, tensioning weights 54, such as shot bags, are positioned and placed end-to-end, near the frame 38 in order to retain the sheets 52a of tensioning material 52 along their full length.

At step 80, a laminate heating and forming cycle is initiated, beginning with heating of the laminate charge. At 82, a desired level of vacuum is drawn in the cavity 56, the HDF machine 32 is vented, and the tensioning weights 54 are removed. At step 84, a forming cycle is initiated and held for a desired time interval. At 86, the HDF machine 32 is vented, releasing the vacuum in the cavity 56, and the forming tool 40 is removed. Then, at 88, the sheets 52a of tensioning material 52 are removed. Finally, at step 90, the formed laminate part may be inspected for wrinkles.

Embodiments of the disclosure may find use in a variety of potential applications, particularly in the transportation industry, including for example, aerospace, marine, automotive applications and other application where composite laminate parts are fabricated by hot drape forming or by similar processes. Thus, referring now to FIGS. 13 and 14, embodiments of the disclosure may be used in the context of an aircraft manufacturing and service method 94 as shown in FIG. 13 and an aircraft 96 as shown in FIG. 14. Aircraft applications of the disclosed embodiments may include, for example, without limitation, spars, stringers, floor beams and similar stiffeners, to name only a few. During pre-production, exemplary method 94 may include specification and design 98 of the aircraft 96 and material procurement 100. During production, component and subassembly manufacturing 102 and system integration 104 of the aircraft 96 takes place. Thereafter, the aircraft 96 may go through certification and delivery 106 in order to be placed in service 108. While in service by a customer, the aircraft 96 is scheduled for routine maintenance and service 110, which may also include modification, reconfiguration, refurbishment, and so on.

Each of the processes of method 94 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 14, the aircraft 96 produced by exemplary method 94 may include an airframe 112 with a plurality of systems 114 and an interior 116. Examples of high-level systems 114 include one or more of a propulsion system 118, an electrical system 120, a hydraulic system 122, and an environmental system 124. Any number of other systems may be included. Although an aerospace example is shown, the principles of the disclosure may be applied to other industries, such as the marine and automotive industries.

Systems and methods embodied herein may be employed during any one or more of the stages of the production and service method 94. For example, components or subassemblies corresponding to production process 102 may be fabricated or manufactured in a manner similar to components or subassemblies produced while the aircraft 96 is in service. Also, one or more apparatus embodiments, method embodiments, or a combination thereof may be utilized during the production stages 102 and 104, for example, by substantially expediting assembly of or reducing the cost of an aircraft 96. Similarly, one or more of apparatus embodiments, method embodiments, or a combination thereof may be utilized while the aircraft 96 is in service, for example and without limitation, to maintenance and service 110.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. Apparatus for hot drape forming a composite laminate part, comprising:
    a tool over which a composite laminate charge may be formed, the tool including at least one corner feature for forming a radius on the part;
    a forming membrane adapted to form the laminate charge over the tool; and
    tensioning material between the tool and the laminate charge for applying a compressive force on the laminate charge at the corner feature to reduce wrinkling of the laminate charge at the radius during the forming;
    wherein the tensioning material has a tensile strength allowing the tensioning material to tear as the laminate charge is being formed over the tool, wherein the tensioning material includes a sheet having surface tack adherence to the laminate charge.

2. The apparatus of claim 1, wherein:
    the tensioning material includes at least one sheet disposed in face-to-face contact with the laminate charge and having an outer periphery extending beyond outer edges of the laminate charge.

3. The apparatus of claim 2, further comprising:
    weights distributed around and loaded onto the outer periphery of the sheet for retaining the sheet around the outer periphery thereof.

4. The apparatus of claim 2, wherein at least the one sheet is disposed in face-to-face contact with an entire area of the laminate charge.

5. The apparatus of claim 3, wherein the weights are distributed about an entire periphery of the composite laminate charge.

6. The apparatus of claim 1, wherein the tensioning material comprises a stretchable material.

7. The apparatus of claim 1, wherein the tensioning material is removable from the laminate charge before and after the laminate charge is formed into the composite laminate part.

8. The apparatus of claim 1, wherein the tensioning material comprises a resin impregnated cloth.

9. The apparatus of claim 1, wherein the at least one corner feature of the tool comprises a 90-degree corner.

10. The apparatus of claim 1, wherein:
    the tensioning material is a first material;

the composite laminate charge is made of a second material; and the first material is different than the second material.

11. The apparatus of claim 10, wherein:

the forming membrane is made of a third material; and the third material is different than the first material and the second material.

12. Apparatus for hot drape forming a composite laminate part, comprising:

a tool over which a composite laminate charge may be formed, the tool including at least one corner feature for forming a radius on the part;

a forming membrane adapted to form the laminate charge over the tool;

tensioning material between the tool and the laminate charge for applying a compressive force on the laminate charge at the corner feature to reduce wrinkling of the laminate charge at the radius during the forming;

a forming table for supporting the forming membrane, the composite laminate charge, and the tensioning material between the forming table and the tool; and a heating element integrated into the forming table and operable to heat the laminate charge.

13. The apparatus of claim 12, further comprising a first membrane sealed to the forming table to form a vacuum tight cavity between the first membrane and the forming membrane.

14. The apparatus of claim 13, further comprising a vacuum within the vacuum tight cavity, wherein the vacuum is configured to draw the first membrane down against the tool and to draw the tensioning material up against the tool.

15. The apparatus of claim 14, wherein the vacuum is configured to place the tensioning material in tension and cause the tensioning material to compress the composite laminate charge against the forming membrane.

16. The apparatus of claim 15, wherein:

a portion of the composite laminate charge forms a flange of the composite laminate part; and the tensioning material compresses the portion of the composite laminate charge that forms the flange of the composite laminate part against the forming membrane.

17. Apparatus for hot drape forming a composite laminate part, comprising:

a tool over which a composite laminate charge may be formed, the tool including at least one corner feature for forming a radius on the part;

a forming membrane adapted to form the laminate charge over the tool; and tensioning material between the tool and the laminate charge for applying a compressive force on the laminate charge at the corner feature to reduce wrinkling of the laminate charge at the radius during the forming, wherein:

the tensioning material comprises a plurality of sheets positioned adjacent each other along the composite laminate charge;

each sheet of the plurality of sheets has a tensile strength allowing the sheet to tear as the laminate charge is being formed over the tool; and each sheet of the plurality of sheets has surface tack adherence to the laminate charge; and weights distributed around and loaded onto an outer periphery of the plurality of sheets for retaining the plurality of sheets around the outer periphery.

18. The apparatus of claim 17, wherein the plurality of sheets abut each other in an end-to-end manner.

19. The apparatus of claim 17, wherein the plurality of sheets overlap each other.

* * * * *